United States Patent [19]

Leasher et al.

[11] 4,320,910
[45] Mar. 23, 1982

[54] PROTECTIVE SHIELD FOR A PIPE FLANGE CONNECTION

[75] Inventors: Arthur L. Leasher; John W. McLaren, both of Beaverton, Mich.

[73] Assignee: The Dow Chemical Company, Midland, Mich.

[21] Appl. No.: 156,841

[22] Filed: Jun. 5, 1980

[51] Int. Cl.³ .............................................. F16L 55/00
[52] U.S. Cl. ........................................ 285/45; 285/363
[58] Field of Search ................. 285/45, DIG. 25, 363, 285/15

[56] References Cited

U.S. PATENT DOCUMENTS

| | | | |
|---|---|---|---|
| 2,699,960 | 1/1955 | Callery et al. | 285/45 X |
| 2,708,123 | 5/1955 | Risley et al. | 285/45 |
| 3,113,790 | 12/1963 | Matthiessen | 285/45 |
| 3,310,322 | 3/1967 | Carroll | 285/45 X |
| 4,049,296 | 9/1977 | Harrison | 285/15 |

FOREIGN PATENT DOCUMENTS 886641  7/1943  France .................................. 285/45

*Primary Examiner*—Thomas F. Callaghan
*Attorney, Agent, or Firm*—V. Dean Clausen

[57] ABSTRACT

A protective shield is disclosed for preventing materials which spray through the gap in an opened flange connection from striking the person who opens the connection. The shield is made up of an inner ring and outer ring, joined only at their ends. When the shield is placed over a flange connection, the ends of the rings are spaced apart slightly so that the flange gap is not completely covered. The shield is positioned so that the space between the rings is on the opposite side of the flanges from the person who is opening the connection. As the connection is opened, any material which might spray through the flange gap is confined by the inner ring, such that it will flow around the flange and discharge through the space between the rings.

7 Claims, 3 Drawing Figures

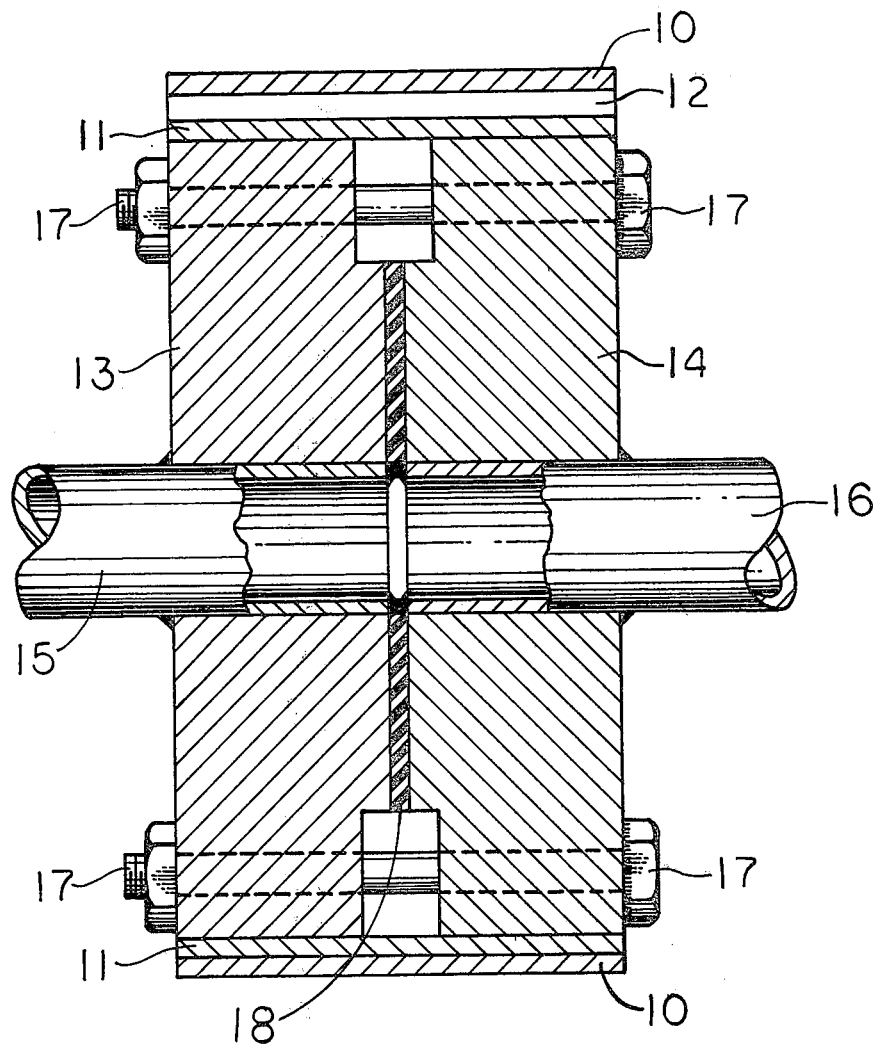

PROTECTIVE SHIELD FOR A PIPE FLANGE CONNECTION

BACKGROUND OF THE INVENTION

The invention relates to a shield for covering a pipe flange connection. A substance which remains in the pipeline when the flange connection is opened, such as a toxic chemical, may injure the person who opens the flange connection to perform a repair or replacement job. This shield prevents the situation from happening.

In many industrial installations, such as chemical plants, it is common practice to connect pipelines together with flanged connections. The connection usually consists of at least two identical flanges. Each flange is welded or otherwise secured to the end of a pipe section and the connection is made by bolting the flanges together with a gasket compressed between the flanges. In a chemical plant, there are various situations which require opening the flange connection from time to time. For example, one reason for opening a flange connection is to replace pipe sections which develop leaks. Another situation which requires opening the flange connection is for the purpose of replacing or repairing equipment, such as pumps, valves, or instruments, which are connected into a pipeline with a flanged connection.

In those instances where a toxic chemical remains in the pipelines at the time the flanged connection is broken, it can be very hazardous to the person opening the flange unless proper safety procedures are taken. For example, frequently the chemical remaining in the pipeline will be under high pressure when the flanges are unbolted, therefore, the chemical may spray out through the gap between the flanges and hit the person working on the line. This is a very undesirable situation even if the maintenance worker is wearing protective clothing, since there is always the possibility of serious injury. Because of this safety problem, there is an urgent need in the industry for a device which can be used on a flange connection to prevent the material remaining in a pipeline from spraying directly onto the person opening the connection.

SUMMARY OF THE INVENTION

The shield of this invention is designed to control release of a material, such as a chemical compound, which might spray out through the gap between the flanges when a flange connection is opened. The shield is made up of two flat ring members, referred to herein as an inner ring and an outer ring. The outer ring surrounds the inner ring and both rings are joined together only at each of their ends. When the flange connection is in its open position, the inner ring clamps around the connection. In a preferred embodiment, the inner ring only partially covers the gap between the flanges in the open connection. Preferably, the outer ring is fabricated of an elastic material, such as spring steel. Also, the outer ring is shaped to a smaller diameter that the inner ring, such that the outer ring exerts a compressive force sufficient to cause the inner ring to clamp around the flange.

DESCRIPTION OF THE DRAWINGS

FIG. 3 is a vertical section view of the pipe flange connection and the shield, taken on line 3—3 of FIG. 2.

DESCRIPTION OF THE PREFERRED EMBODIMENT

Figure 1:
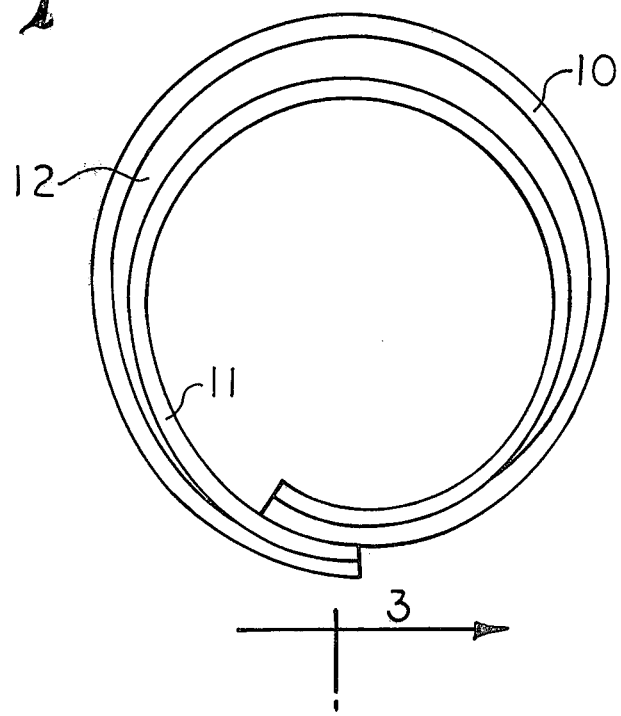
FIG. 1 is a front elevation view of the shield of this invention.

In the Drawing, referring particularly to FIG. 1, the shield of this invention is made up of a flat outer ring 10 and flat inner ring 11. The inner ring 11 should be fabricated of materials which are resilient enough for the ring to conform to the circular shape of a pipe flange. This material also needs to be a composition which will not rapidly deteriorate upon contact with highly corrosive substances, such as strong acids. Suitable materials for the inner ring would include plastic resins, such as Teflon fluorocarbon resins, styron polystyrene resins, metals, such as spring steel, stainless steel, Hastelloy nickel-base metals, and the like.

The outer ring 10 should be fabricated of a highly elastic material, preferably spring steel. Also, in the fabrication of the outer ring, it is shaped to a smaller diameter than the inner ring. This is done to give the outer ring a greater compressive force than the inner ring, and this force is utilized to increase the clamping action of the inner ring around the flange connection. Before the shield is placed on a flange connection, it is in a free position, as illustrated in FIG. 1. In this position, the two ends of the rings in the shield will overlap because of the compressive force of the outer ring. When the shield is fabricated, only the ends of the outer ring 10 and the inner ring 11 are joined together, as noted in FIGS. 1 and 2. Because the rings are joined only at the ends, there is a space 12 defined between the two rings. The ends of the two rings may be joined together by spot welding, soldering, brazing, rivets, or any of various other known fastening means.

OPERATION

The invention can be illustrated by describing a typical operation in which the shield is used on a pipe flange connection to control release of a substance through the connection. Usually, the shield is employed to control release of a liquid composition, such as various chemical compounds, which can spray out through the connection when it is opened. It is also contemplated that the shield would be useful in preventing solids or gases which may remain in a pipeline from directly contaminating a person opening the flange connection.

Figure 2:
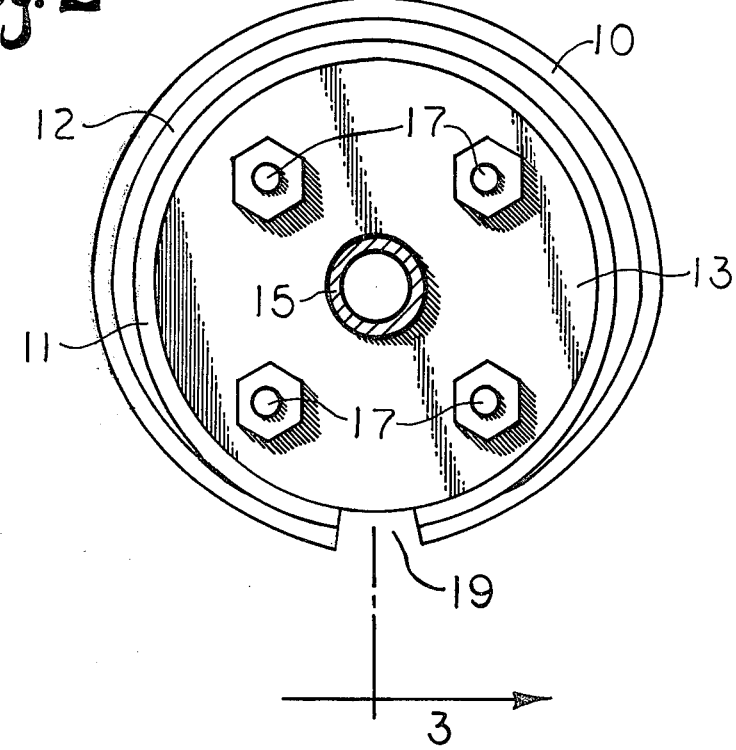
FIG. 2 is a front elevation view of a pipe flange connection and the shield, with the shield being clamped around the flange connection in its normal operating position.

A typical pipe flange connection, as illustrated in FIGS. 2 and 3, consists of two identical flanges 13 and 14. Each flange is fitted over the end of a pipe section, as indicated by numerals 15 and 16. The connection is made by bolting the flanges together with several heavy duty bolts, indicated by numeral 17. In addition, a gasket 18 is compressed between the flanges to make a good seal.

Before the flange connection is broken, the shield is slipped over the connection so that the inner ring 11 is clamped snugly around the rim of both flanges. When the shield is in its normal operating position on the flange connection, as shown in FIG. 2, the ends of the rings 10 and 11 will be spaced apart, as indicated at 19. The reason the rings are spaced apart is because the shield is usually fabricated such that it has a smaller diameter than the flanges in the connection.

Because of the space 19 between the ends of the rings, the shield does not completely cover the gap which is created when the flange connection is opened. The space 19 thus provides an outlet for any material remaining in the pipeline which might spurt out through the flange connection. For example, if the material remaining in the pipeline is a liquid substance, especially if it is under pressure, it may spray out through the flange gap in all directions and strike the person opening the connection.

The shield described herein prevents the problem described above. For example, when the flange connection is broken, any liquid which surges into the flange gap is deflected by the inner ring 11 so that it flows around to the space 19 and drips or sprays out of the connection. To make the flange opening operation as safe as possible, the shield is usually positioned so that the space 19 is at the bottom of the flange connection, as indicated in FIG. 3, or at some other point on the flanges which is farthest from the person working on the connection.

Because the shield described herein is made of an elastic material, it has the capability of fitting flange connections of several different sizes. When the shield is placed over a flange connection, the width of the space 19 between the ends of the flange rings will vary according to the size of the flanges in the connection. The elastic property of the shield also enables it to "self-lock" around a flange connection. For this reason, the shield may be used on flange connections which are disposed horizontally, vertically, or in some oblique position.

What is claimed is:

1. Shield for controlling release of material through an open pipe flange connection, said connection including at least two flanges, the shield comprising:
    a first flat member which defines an inner ring;
    the inner ring adapted to clamp around the flange connection and completely enclose a gap defined between the flanges when the flange connection is in an open position;
    a second flat member which defines an outer ring;
    the outer ring is fabricated of an elastic material, the outer and inner rings are joined together at their ends, such that the outer ring encloses the inner ring, and the outer ring is formed to a smaller diameter than the inner ring, such that the outer ring exerts a compressive force sufficient to cause the inner ring to clamp around the flange connection.

2. The shield of claim 1 in which the inner ring is fabricated of a plastic resin material, and the outer ring is fabricated of spring steel.

3. The shield of claim 1 in which the inner ring is fabricated of spring steel.

4. The shield of claim 1 in which the inner ring is fabricated of a corrosion-resistant material.

5. The shield of claim 1 in which a space is defined between the ends of the inner ring when the shield is clamped around the flange connection, such that the inner ring partially covers the gap defined between the flanges, and the shield is positioned on the flange connection such that the space between the ends of the inner ring is located at the bottom of the flange connection.

6. The shield of claim 1 in which a liquid material is released through the pipe flange connection, and said liquid material is deflected by the inner ring such that it discharges from the flange connection through the space defined between the ends of the inner ring.

7. In combination, a pipe flange connection including at least two flange members, and a shield for controlling release of material through the flange connection, when said connection is open, the shield including:
    a flat, spring steel member which defines an inner ring;
    a second flat, spring steel member which defines an outer ring;
    the inner ring is adapted to clamp around the flange connection and partially cover a gap defined between the flanges when the flange connection is in an open position;
    the outer and inner rings are joined together only at the ends of each ring, such that the outer ring encloses the inner ring, and the outer ring is formed to a smaller diameter than the inner ring, such that the outer ring exerts a compressive force sufficient to cause the inner ring to clamp around the flange connection.

* * * * *